(12) United States Patent
Gilbert et al.

(10) Patent No.: US 9,063,700 B2
(45) Date of Patent: Jun. 23, 2015

(54) LOW-FORCE GAP-FILLING CONDUCTIVE STRUCTURES

(75) Inventors: Taylor H. Gilbert, Sunnyvale, CA (US); Derek W. Wright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 13/601,542

(22) Filed: Aug. 31, 2012

(65) Prior Publication Data

US 2014/0063773 A1 Mar. 6, 2014

(51) Int. Cl.
*H05K 9/00* (2006.01)
*G06F 1/16* (2006.01)

(52) U.S. Cl.
CPC .................... *G06F 1/1656* (2013.01)

(58) Field of Classification Search
CPC ... G06G 1/1656; G06G 1/182; H05K 9/0015; H05K 9/0016; H05K 9/0009; H05K 9/0062; H05K 9/0032; H05K 2201/10257; H05K 2201/10; H05K 7/1438; F16J 15/064; F16J 14/0893
USPC .............. 361/679.3, 730, 733, 758, 800, 804, 361/816, 818; 174/126.1, 351, 356, 366, 174/370; 455/575.5, 575.7
See application file for complete search history.

(56) References Cited

U.S. PATENT DOCUMENTS

| | | | | |
|---|---|---|---|---|
| 5,569,877 | A * | 10/1996 | Yumi | 174/366 |
| 6,465,731 | B1 * | 10/2002 | Miska | 174/358 |
| 7,470,866 | B2 * | 12/2008 | Dietrich et al. | 174/356 |
| 8,138,239 | B2 | 3/2012 | Prack et al. | |
| 8,396,106 | B2 * | 3/2013 | Connolly et al. | 375/232 |
| 2003/0128519 | A1 | 7/2003 | Justo et al. | |
| 2008/0078574 | A1 * | 4/2008 | Kang et al. | 174/358 |
| 2009/0267906 | A1 * | 10/2009 | Schroderus | 345/173 |
| 2010/0321897 | A1 | 12/2010 | Hill et al. | |
| 2011/0155989 | A1 | 6/2011 | Park et al. | |

* cited by examiner

*Primary Examiner* — Lisa Lea Edmonds
*Assistant Examiner* — Christopher L Augustin
(74) *Attorney, Agent, or Firm* — Treyz Law Group; Joseph F. Guihan; Kendall P. Woodruff

(57) ABSTRACT

Electronic devices may be provided with conductive structures and antennas mounted near a gap between the conductive structures. A conductive member may be used to at least partially fill the gap in order to prevent emission from the antenna from entering the gap and interfering with the operation of the antenna. The conductive gap-filling member may include a conductive outer layer and a non-conductive inner layer. The inner layer may have opposing edge portions that are attached to each other or may be a continuous tubular insulating layer. The outer layer may be a layer of conductive fabric having opposing edge portions that are attached to each other or to opposing edge portions of the inner layer. An edge portion of the outer layer may be attached to a conductive structure. An insulating material may be formed between another edge portion of the outer layer and a second conductive structure.

19 Claims, 8 Drawing Sheets

LOW-FORCE GAP-FILLING CONDUCTIVE STRUCTURES

BACKGROUND

This relates generally to electronic devices and, more particularly, to gap-filling conductive members for electronic devices.

Conductive gaskets are sometimes used in electronic devices to form electrical connections between conductive structures. Gaps between conductive structures are sometimes formed in the vicinity of an antenna within a device. This type of gap is sometimes filled with a conductive gasket in order to prevent signals from the antenna from entering the gap.

Conductive gaskets are typically formed from foam that is wrapped in a conductive fabric and compressed between the conductive structures.

It can be challenging to use foam gaskets. The biasing forces produced by compressed foam may tend to disassemble parts and may create undesired stresses. Overcoming the strong biasing forces that may result from the use of thick foam can be difficult and can force a designer to make undesired compromises when constructing an electronic device.

Conductive gaskets that are used to prevent signals from the antenna from entering the gap between conductive structures can also create undesired electrical connections between the conductive structures.

It would therefore be desirable to be able to provide improved conductive gap-filling members for use in electronic devices.

SUMMARY

Electronic devices may be provided with conductive structures such as conductive portions of displays and conductive housing walls. Radio-frequency emitting components such as antennas may be mounted near gaps between the conductive structures. Conductive gap-filling members may be provided that at least partially fill the gaps. A compressed conductive gap-filling member may press outwards against the conductive structures. The conductive gap-filling member may be electrically coupled to one of the conductive structures and electrically insulated from another conductive structure.

The conductive gap-filling member may include a wall structure. The wall structure may surround and at least partly enclose an air-filled cavity. By avoiding the use of internal support structure material in at least part of the interior of the gap-filling member, outward biasing forces that are produced when the gap-filling member is compressed may be minimized.

The wall structures may be formed from conductive fabric, metal coated on dielectric sheets, or other conductive wall structures. Conductive fabric may be formed from metal fibers, dielectric fibers coated with metal, combinations of conductive fibers and fibers that are not conductive, or other suitable fibers.

Conductive fabric may be wrapped partially or completely around bent non-conductive pliant material such as polyethylene terephthalate, biaxially-oriented polyethylene terephthalate, or other suitable conductive fabric that partially or completely surrounds the air-filled cavity. The non-conductive pliant material may form a non-conductive pliant tube within the conductive fabric or may form a U-shaped partial tube having edges along which edges of the conductive fabric are attached.

The gap-filling conductive member may be formed between a touch-sensitive layer of a display and a light-emitting layer of a display. The gap-filling conductive member may form a loop of conductive material within the gap or may form a partial loop of conductive material having edges that are aligned with the edges of the conductive structures.

Further features of the invention, its nature and various advantages will be more apparent from the accompanying drawings and the following detailed description of the preferred embodiments.

DETAILED DESCRIPTION

Electronic devices may be provided with antennas and other wireless communications circuitry. The wireless communications circuitry may be used to support wireless communications in wireless communications bands such as wireless local area network bands, cellular telephone bands, satellite navigation system bands, and other communications bands.

Electronic device may also contain electronic components such as displays. Displays and other electronic components may include structures formed from conductive materials. Due to manufacturing tolerances, air gaps of varying width may be formed between adjacent conductive structures. For example, a display may include a conductive touch-sensitive layer for gathering user input and a conductive display layer that generates light for displaying images to a user. A gap may be formed between the touch-sensitive layer and the light-generating layer. This type of gap between conductive structures may cause electromagnetic interference (EMI) if an antenna is mounted in close proximity to the gap.

By at least partially filling the gap between the conductive structures with a conductive gap-filling member, EMI within an electronic device may be reduced.

A conductive gap-filling member may be interposed between opposing conductive structures. The conductive gap-filling member may be configured to at least partially span the air gap between the opposing conductive structures when the conductive structures and gap-filling members are assembled together into an electronic device.

The conductive gap-filling member may be compressed between opposing conductive structures during device assembly. An insulating material may be interposed between the conductive gap-filling member and one of the conductive structures. Excessive restoring force from the compressed member may be avoided by using hollow gap-filling member arrangements and/or gap-filling member configurations that include relatively weak internal biasing structures. Examples of weak internal biasing approaches include the use of hollow gap-filling members, the use of members that are partially hollow, the use of members that are only partly filled with foam, the use of members filled with plastic wool, the use of corrugated internal biasing structures, and the use of other biasing structures that contain relatively large amounts of air so that the interior cavity regions within the members are at least partly air filled.

Figure 1:
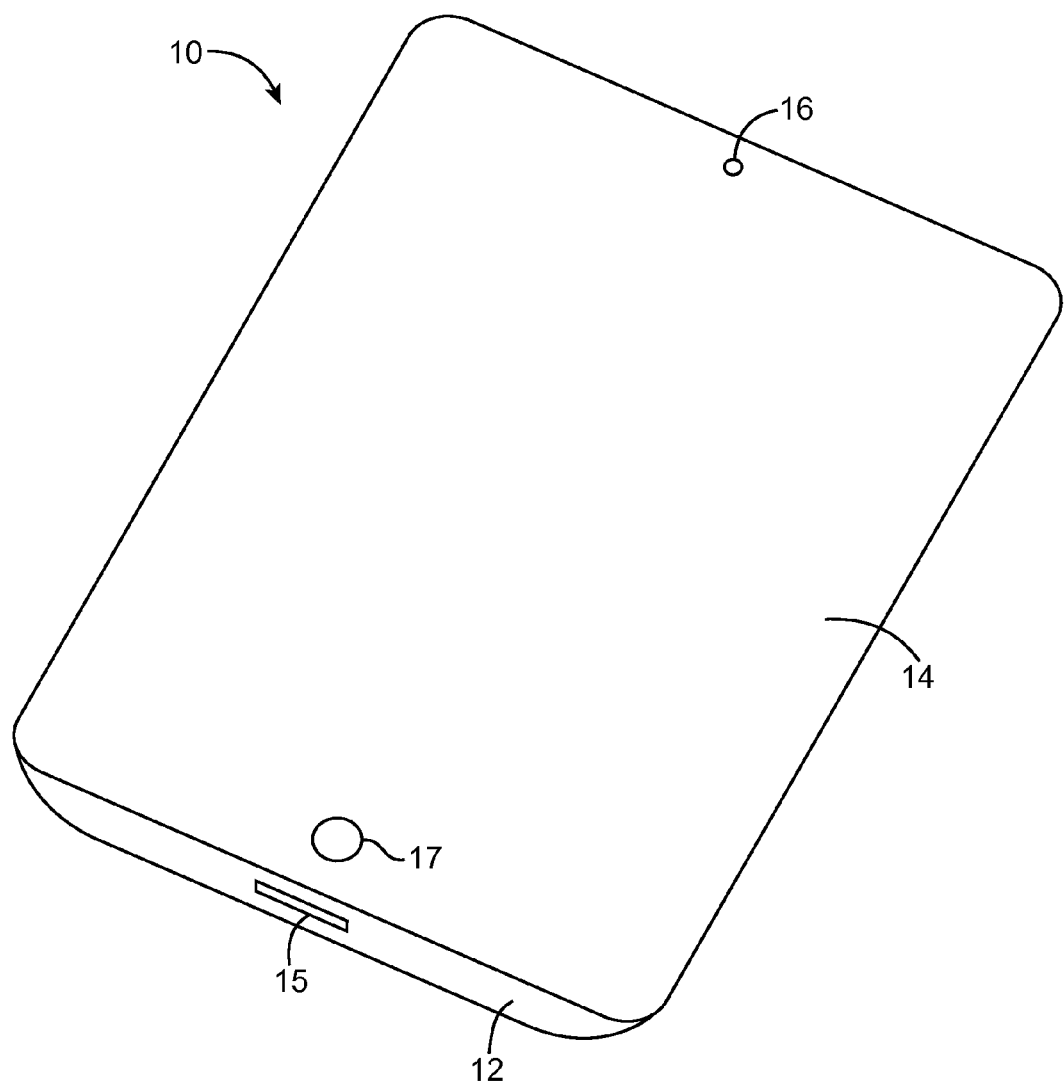
FIG. 1 is a perspective view of an illustrative electronic device with conductive gap-filling members in accordance with an embodiment of the present invention.

An illustrative electronic device of the type that may be provided with one or more conductive gap-filling members is shown in FIG. 1. Electronic device 10 may be a computer such as a tablet computer. Electronic device 10 may also be a laptop computer, a computer that is integrated into a display such as a computer monitor, a somewhat smaller portable device such as a wrist-watch device, pendant device, headphone device, earpiece device, or other wearable or miniature device, a cellular telephone, a media player, or other electronic equipment. Illustrative configurations in which electronic device 10 is a tablet computer are sometimes described herein as an example. In general, electronic device 10 may be any suitable electronic equipment.

Device 10 may include conductive structures that are separated by an air gap. Conductive gap-filling members may be formed in the gaps between conductive structures in device 10. Gap-filling members may be formed in edge locations that run parallel to the four edges of device 10 and/or corner locations at the upper or lower corners of device 10 (as examples). The conductive structures may include conductive housing structures, conductive structures such as metal traces on dielectric carriers, conductive structures that are parts of display modules (e.g., metal chassis structures, light-generating layers, and touch-sensitive layers), metal traces in flexible printed circuits and rigid printed circuits, metal foil supported by dielectric carrier structures, wires, cables, and other conductive materials.

Device 10 may include a display such as display 14. Display 14 may be mounted in a housing such as electronic device housing 12. Housing 12 may be supported using a stand or other support structure.

Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Display 14 may be a touch screen that incorporates capacitive touch electrodes or other touch sensor components or may be a display that is not touch sensitive.

Display may be provided with a cover layer having one or more openings. For example, a rigid cover layer may have openings such as an opening for button 17 and a speaker port opening for speaker 16 (e.g., for an ear speaker for a user). Device 10 may also have other openings in display 14 and/or openings in housing 12 such as opening 15 for a data port connector or openings for accommodating volume buttons, ringer buttons, sleep buttons, and other buttons, openings for an audio jack, data port connectors, removable media slots, etc.

Figure 2:
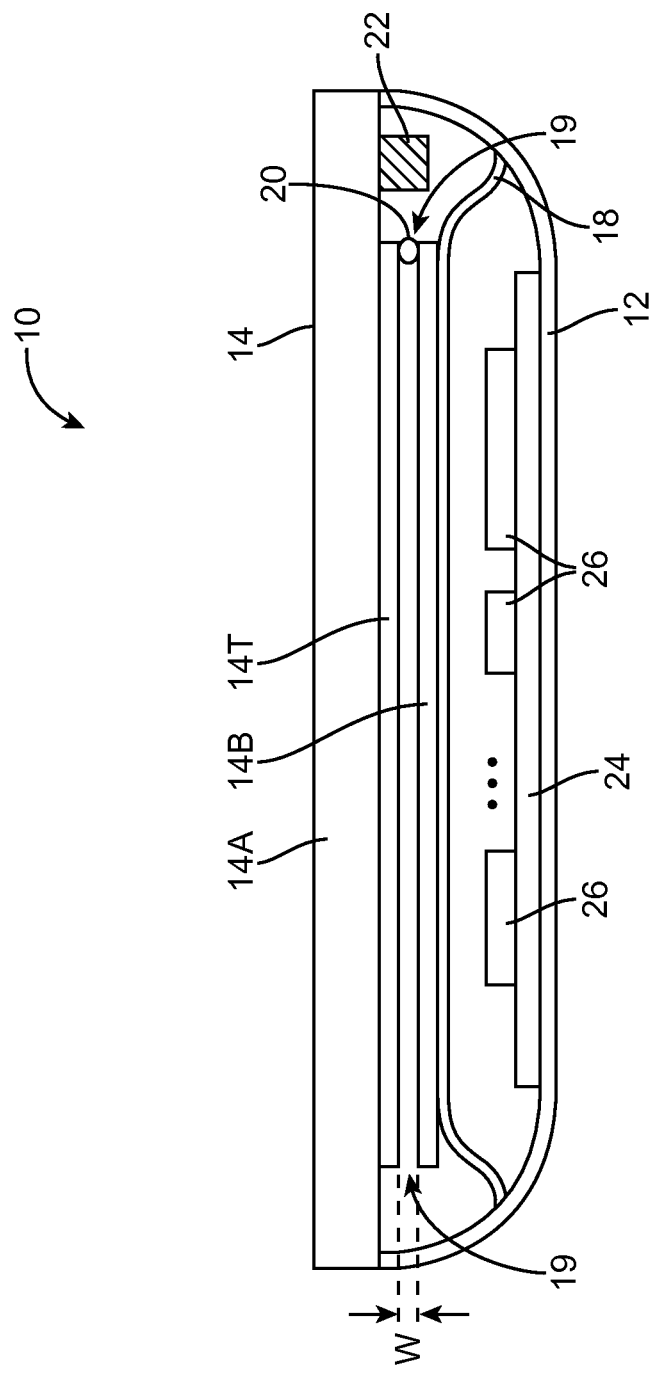
FIG. 2 is a cross-sectional side view of illustrative conductive gap-filling members within an illustrative electronic device in accordance with an embodiment of the present invention.

A cross-sectional side view of device 10 is shown in FIG. 2. As shown in FIG. 2, display 14 may include a transparent display cover layer such as display cover layer 14A. Display cover layer 14A may be formed from a clear glass layer, a transparent layer of plastic, or other transparent material. Display 14 may include touch-sensitive layer 14T. Touch-sensitive layer 14T may incorporate capacitive touch electrodes such as horizontal transparent electrodes and vertical transparent electrodes. Touch-sensitive layer 14T may, in general, be configured to detect the location of one or more touches or near touches on display cover layer 14A based on capacitive, resistive, optical, acoustic, inductive, or mechanical measurements, or any phenomena that can be measured with respect to the occurrences of the one or more touches or near touches in proximity to touch sensitive layer 14T.

Software and/or hardware may be used to process the measurements of the detected touches to identify and track one or more gestures. A gesture may correspond to stationary or non-stationary, single or multiple, touches or near touches on cover layer 14T. A gesture may be performed by moving one or more fingers or other objects in a particular manner on cover layer 14A such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Display 14 may include display structures 14B. Display structures 14B may be mounted on a support structure such as cowling 18, may be attached to cover layer 14A, or may be attached to housing 12 (as examples). Display structures 14B may include an array of display pixels for displaying images for a user. Display cover layer 14A may be used to protect display structures 14B and touch sensor structures 14T in display 14. Display structures 14B may include display pixels formed from light-emitting diodes (LEDs), organic LEDs (OLEDs), plasma cells, electrophoretic display structures, electrowetting display structures, liquid crystal display (LCD) components, or other suitable display pixel structures.

As shown in the example of FIG. 2, conductive gap-filling members such as conductive gap-filling members 20 may be used to at least partially fill an air gap between opposing conductive structures in device 10. In the FIG. 2 configuration, members 20 are being used to fill gap 19 between display structures 14B and touch-sensitive layer 14T. Gap 19 may have a width W of 2 mm to 3 mm, 0.5 mm to 3 mm, 0.5 mm to 5 mm, 0.5 mm to 1.5 mm, less than 3 mm, or more than 0.5 mm (as examples). Display structures 14B may include conductive structures such as a metal chassis member that surrounds and encloses the lower portion of display structures 14B. Touch-sensitive layer 14T may include conductive structures such as a metal chassis member that surrounds and encloses the lower portion of layer 14T or other conductive structures such as patterned indium-tin oxide that is attached to display cover layer 14A.

Housing 12 may include metal walls. If desired, members such as member 20 may be used in at least partially filling an air gap between the metal chassis member of display 14 or other conductive component structures and conductive housing 12 or may otherwise be used in filling gaps between conductive structures in device 10.

By forming conductive interfaces such as member 20 that fill gaps between opposing conductive structures such as display structures 14B and touch-sensitive layer 14T and by otherwise filling gaps between conductive structures within device 10, potential pathways for electromagnetic interference within device 10 may be reduced or eliminated. For example, by forming a conductive seal between display structures 14B and/or touch-sensitive layer 14T, potential pathways for electromagnetic interference between gap 19 and antenna 22 may be blocked.

Antenna 22 may be configured to emit radio-frequency signals (e.g., WiFi® signals at 2.4 GHz and 5 GHz, Bluetooth® signals at 2.4 GHz, cellular telephone signals such as 800 MHz band signals, 850 MHz band signals, 900 MHz band signals, 1800 MHz band signals, 1900 MHz band signals, 2100 MHz band signals, 700 MHz band signals, and signals in other communications bands).

Components 26 may include display driver circuitry, processors, memory, communications circuitry such as wireless transceiver circuitry, and application-specific integrated circuits. By blocking air gap 19 between display structures 14B and/or touch-sensitive layer 14T, a reduced number of signals emitted by antenna 22 may be absorbed in gap 19 or reflected from gap 19, thereby improving wireless performance for device 10. In general, conductive gap-filling members such as conductive gap-filling member 20 of FIG. 2 may be used to partially or completely fill a gap between any two or more conductive structures in device 10. The illustrative configuration of FIG. 2 is merely an example.

Members 20 may have a hollow tube shape or other configuration that is compressible, but that does not exert excessive restoring forces upon structures in device 10 following assembly. As examples, member 20 may be configured exert a restoring force on structures 14T and/or 14C of less than 2.5 kg per 10 mm of length of member 20, less than 0.5 kg per 10 mm of length, or between 0.5 and 1.5 kg per 10 mm of length.

Figure 3:
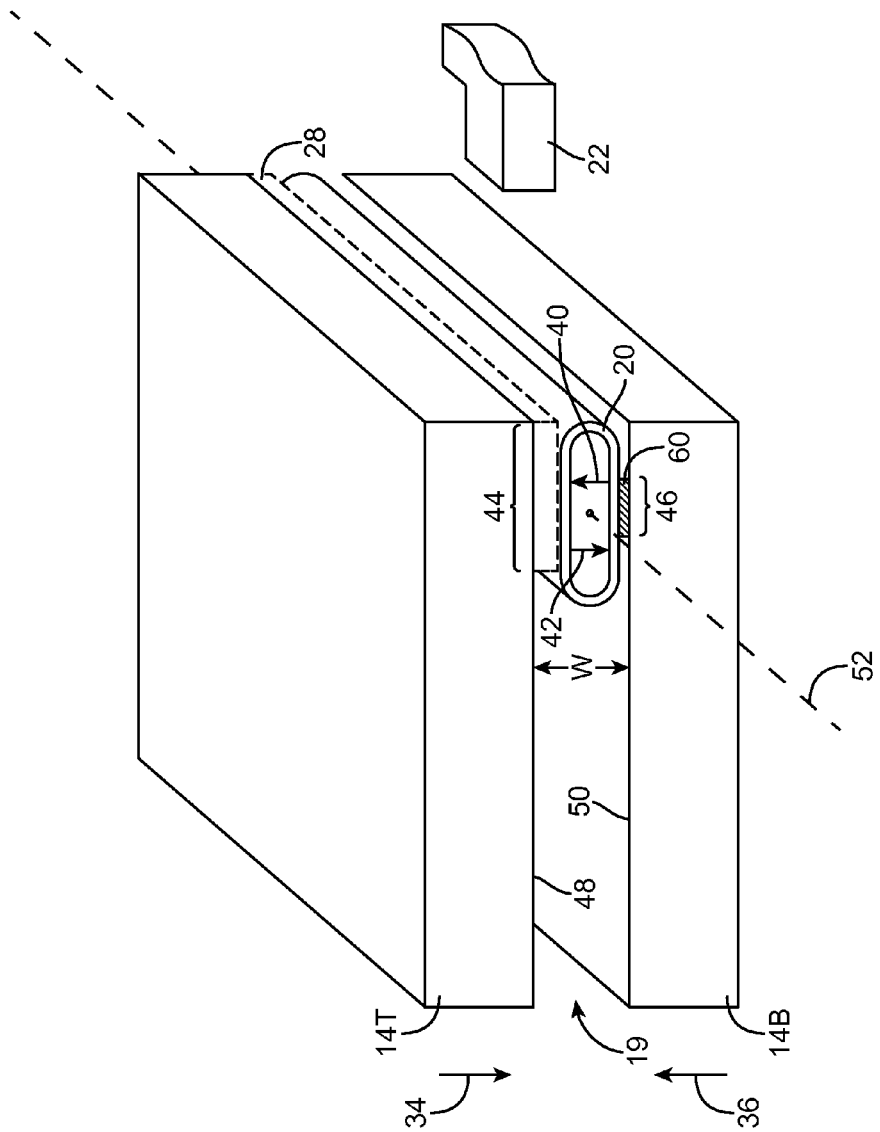
FIG. 3 is a perspective view of an illustrative tube-shaped conductive gap-filling member compressed between two opposing conductive structures in accordance with an embodiment of the present invention.

An illustrative arrangement in which a hollow tube-shaped conductive gap-filling member has been compressed between two opposing conductive structures is shown in FIG. 3. As shown in FIG. 3, conductive device structures such as display structures 14B and touch-sensitive layer 14T may be moved towards each other during device assembly operations. As structure 14T is moved downwards in direction 34 towards structure 14B and/or as structure 14B is moved upwards in direction 36 towards structure 14T, conductive member 20 may be compressed between structures 14T and 14B.

When compressed, member 20 may press outwards against conductive structures 14T and 14B, thereby filling gap 19. For example, the upper portion of member 20 may press upwards in direction 40 against lower surface 48 of structure 14T in region 44 and the lower portion of member 20 may press downwards in direction 42 against upper surface 50 of structure 14B in region 46. The lower portion of member 20 may be attached to structure 14B using an adhesive such as conductive adhesive 60 (e.g., an anisotropic conductive adhesive).

Because conductive structures such as display structures 14B and/or touch-sensitive layer 14T include functional electronic components, it may be desirable to electrically insulate structure 14T from structure 14B (e.g., to insulate display structures 14B from touch-sensitive layer 14T) while providing a conductive wall that prevents radiation from antenna 22 from entering gap 19. In order to prevent member 20 from forming an electrical pathway between structures 14T and 14B, an insulating material such as insulating structure 28 may be interposed between lower surface 48 of structure 14T and member 20. However, this is merely illustrative. If desired, an air gap that is smaller than gap 19 may remain between surface 48 and member 20.

Insulating structure 28 may be formed from any suitable dielectric material such as porcelain, glass, plastic, combinations of these materials or other suitable insulating materials.

Conductive gap-filling members such as member 20 may have any suitable shape. In the example of FIG. 3, member 20 has an elongated hollow tube shape that extends along longitudinal axis 52. If desired, conductive gap-filling members such as member 20 may be formed with other shapes (e.g., circular outlines, rectangular outlines, square outlines) and may have other cross-sectional shapes. Members 20 may have shapes that accommodate internal biasing structures while leaving room for air-filled cavities within the interior of member 20, may have shapes that are completely hollow at one location along their length but that are not completely hollow at another location along their length, etc. The elongated tubular shape of conductive member 20 of FIG. 3 is merely illustrative.

Figure 4:
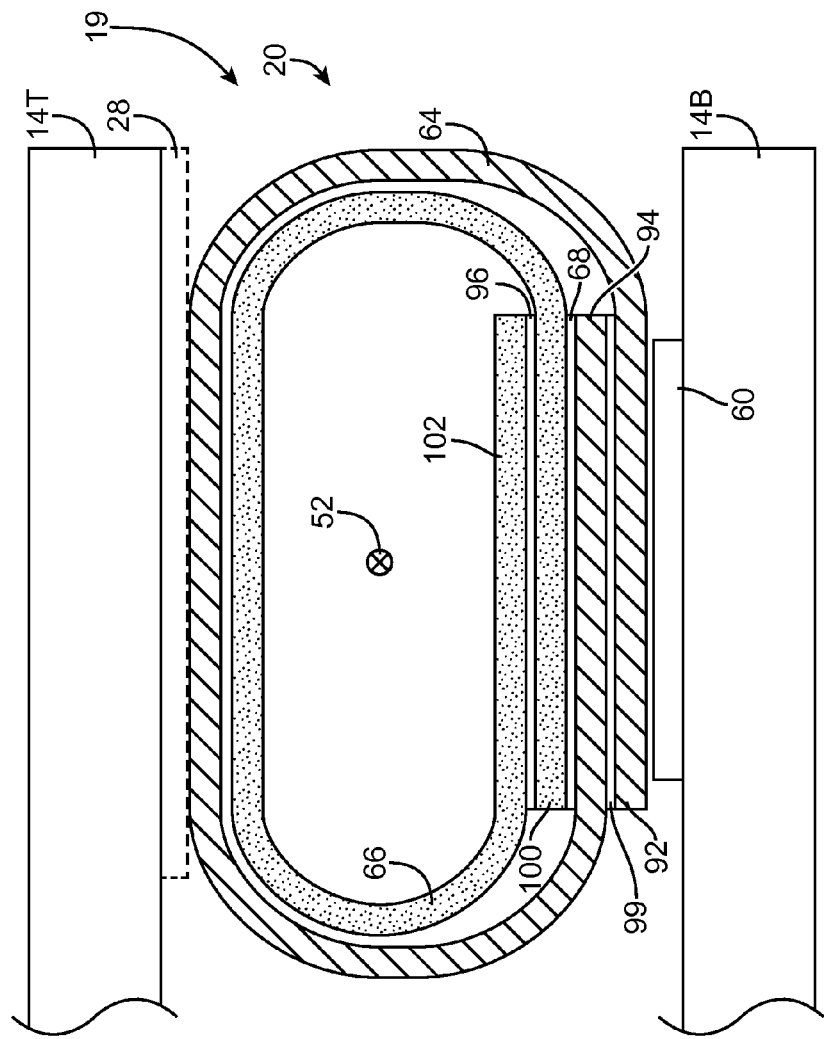
FIG. 4 is a cross-sectional side view of a portion of a hollow gap-filling member in which a wall structure is formed from a conductive outer layer of material such as a layer of conductive foil or conductive fiber and an inner insulating support layer with overlapping edges that lines the inner surface of the conductive outer layer in accordance with an embodiment of the present invention.

FIG. 4 is a cross-sectional view of conductive member 20 in a configuration in which member 20 is formed from layers of material that are wrapped around longitudinal axis 52 to form an O-shaped tube. As shown in FIG. 4, member 20 may be formed from a conductive outer layer of material (layer 64) and one or more inner layers of non-conductive material such as layer 66. Outer layer 64 may be, for example, a conductive fabric such as a fabric formed from solid conductive fibers and/or fibers with two or more layers of material such as an inner core covered with an outer conductive layer of metal. If desired, some or all of outer layer 64 may be formed from a sheet of flexible metal (e.g., metal foil).

Outer layer 64 of member 20 may have opposing edge portions such as edge portion 92 and edge portion 94. Edges 92 and 94 may be wrapped on top of each other so that edge 94 overlaps edge 92. Adhesive such as adhesive layer 99 may be used in securing conductive edge 92 to conductive edge 94. Adhesive 60 may be used to attach portion 92 to conductive structure 14B. If desired, adhesives such as adhesives 60 and 99 may be formed from conductive adhesive to promote formation of a satisfactory electrical contact between member 20 and conductive structure 14B. Insulating material 28 may be interposed between conductive structure 14T and member 20, thereby preventing conductive member 20 from forming an electrical path between opposing conductive structures 14T and 14B. However, this is merely illustrative. If desired, structure 14T may be provided without any insulating material. In configurations in which structure 14T is provided without any insulating material, an air gap that is substantially smaller than gap 19 may be provided between member 20 and structure 14T.

As shown in FIG. 4, outer conductive layer 64 of member 20 may be attached to one or more inner layers such as layer 66. For example, outer layer 64 may be attached to inner layer 66 using adhesive layer 68. Adhesive layer 68 may be formed from a pressure sensitive adhesive material, a conductive adhesive material, or other suitable adhesive materials. Inner layer 66 may line the interior surface of layer 64 and may provide layer 64 with additional strength and resiliency. Inner layer 66 may be formed from a flexible layer of insulating material, a flexible layer of fabric, a flexible layer of plastic, a flexible layer of foam, a flexible layer of polyethylene terephthalate, a flexible layer of biaxially-oriented polyethylene terephthalate, a flexible layer of one or more other materials, or a flexible layer formed from two or more such layers. If desired, additional layers may be stacked below layer 66 (e.g., layer 66 may be lined with one or more additional layers of fabric, one or more additional layers of plastic, one or more additional layers of foam, etc.).

Inner layer 66 of member 20 may have opposing edge portions such as edge portion 100 and edge portion 102. Edges 100 and 102 may be wrapped on top of each other so that edge 102 overlaps edge 100. Adhesive such as adhesive layer 96 may be used in securing non-conductive edge 100 to non-conductive edge 102. Adhesive 68 may be used to attach non-conductive portion 100 of inner layer 66 to conductive portion 94 of conductive outer layer 64.

Internal support structures 66 for O-shaped member 20 of FIG. 4 may be varied in type and size along the length of longitudinal axis 52. For example, one type of support structure may be used in one longitudinal position and another type of support structure (or no support structure) may be positioned at an adjacent longitudinal position. Support structures of different types may be alternated with each other along the length of longitudinal axis 52, to ensure that member 20 provides a desired amount of outward restoring force when compressed between opposing conductive structures 14T and 14B.

Figure 5:
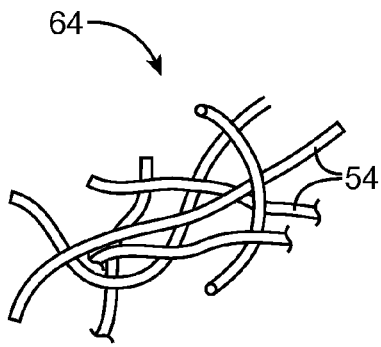
FIG. 5 is a diagram of illustrative fibers in a conductive fabric in accordance with an embodiment of the present invention.

Conductive material for outer layer 64 may be formed from a sheet of metal, a metal coating on a sheet of dielectric, metal fibers, metal-coated fibers, or other suitable conductive material. As shown in FIG. 5, layer 64 may be formed from fibers such as fibers 54 (e.g., layer 64 may be formed from a layer of conductive fabric). Fibers 54 may include metal fibers, plastic fibers coated with metal, glass fibers, carbon fibers, organic fibers, inorganic fibers, fibers formed from other materials, and fibers formed from two or more of these materials. Fibers 54 may have circular cross-sectional shapes, oval cross-sectional shapes, rectangular cross-sectional shapes, square cross-sectional shapes, triangular cross-sectional shapes, and other cross-sectional shapes.

Figure 6:
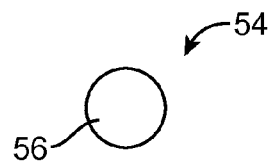
FIG. 6 is a cross-sectional view of a fiber such as a solid fiber in a conductive fabric in accordance with an embodiment of the present invention.
Figure 7:
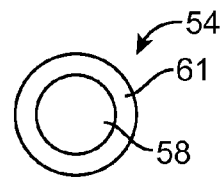
FIG. 7 is a cross-sectional view of a fiber coated with a conductive material such as metal in a conductive fabric in accordance with an embodiment of the present invention.

As shown in FIG. 6, fibers 54 in layer 64 may be formed from a solid material such as material 56. Material 56 may be, for example, a conductive material such as metal. As shown in FIG. 7, fibers 54 may include multiple materials such as inner material (core) 58 and outer material (coating) 61. Core 58 may be, for example, a dielectric such as glass, plastic, or ceramic, or may be a conductive material such as metal (as examples). Outer layer 61 of fiber 54 may be formed from a conductive material such as metal (as an example). Layer 61 may be formed on each of fibers 54 before fibers 54 are used in forming conductive fabric or other fiber-based material for layer 64 of member 20 or may be deposited as a coating on fibers 54 after fibers 54 have been used to form conductive fabric or other fiber-based material for layer 64 (e.g., after fibers 54 have been woven into a fabric layer).

Figure 8:
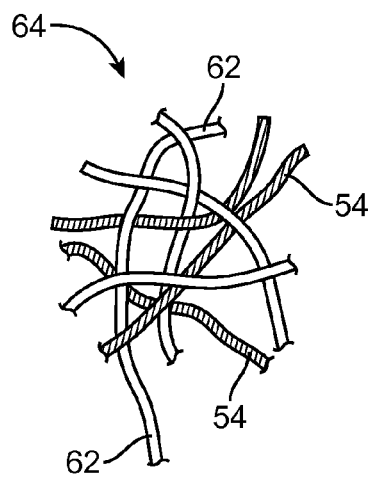
FIG. 8 is a diagram of a conductive fabric having conductive fibers and other fibers in accordance with an embodiment of the present invention.

As shown in FIG. 8, layer 64 (e.g., a fabric sheet for forming layer 64) may include multiple fibers such as fibers 54 and fibers 62. Fibers 54 may include conductive fibers such as solid metal fibers and/or dielectric fibers coated with metal or other conductive fibers. Fibers 62 may be formed from plastic, glass, or other non-conductive material. For example, fibers 62 may be formed from solid dielectric material with a circular cross-sectional shape. If desired, fabric structures such as structures 64 of FIG. 8 may be formed from three or more different types of fibers (e.g., conductive fibers and/or dielectric fibers). The example of FIG. 8 in which structures 64 include two types of fiber is merely illustrative.

The configuration of member 20 of FIG. 4 is merely illustrative. If desired, layers 64 and 66 of member 20 may be arranged in other configurations. Examples of other configurations for layers 64 and 66 of member 20 are shown in FIGS. 9, 10, and 11.

Figure 9:
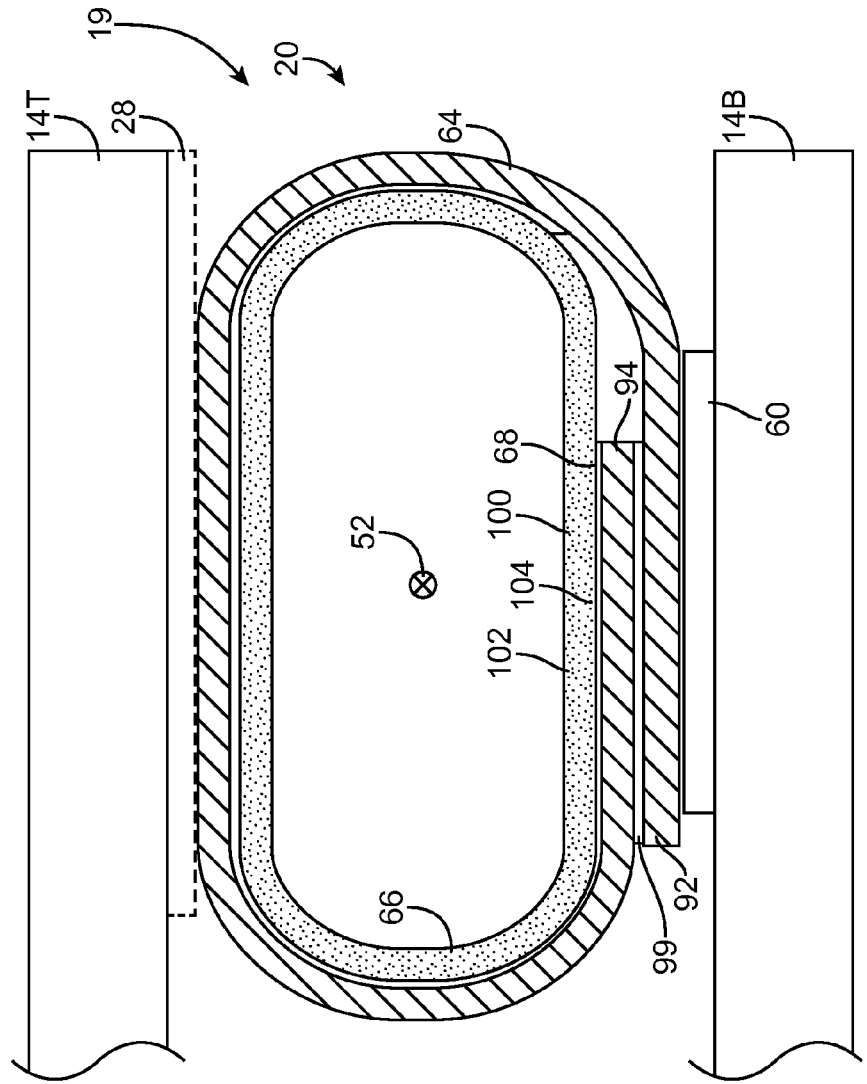
FIG. 9 is a cross-sectional side view of a portion of a hollow gap-filling member in which a wall structure is formed from a conductive outer layer of material such as a layer of conductive foil or conductive fiber and an inner insulating support layer with fused edges that lines the inner surface of the conductive outer layer in accordance with an embodiment of the present invention.

As shown in FIG. 9, inner non-conductive layer 66 may be formed without overlapping edges. Layer 66 may, for example, have edges 100 and 102 that are fused at a joint such as intersection point 104. Edges 100 and 102 may be separate edges that have been fused together (e.g., using adhesive between edges 102 and 100, by splicing edges 102 and 100, or otherwise bonding edge 102 to edge 100) or layer 66 may be formed without any edges (e.g., layer 66 may be a continuous tube of insulating material). In the example of FIG. 9, adhesive 68 is used to attach edge 94 of outer conductive layer 64 to continuous tubular inner layer 66. Adhesive 68 may be formed between edge portion 94 of layer 64 and inner layer 66 or may be formed between a larger portion of layer 64 and inner layer 66.

In the examples of FIGS. 4 and 9, conductive outer layer 64 substantially surrounds non-conductive layer 66 and forms a loop of conductive material. However, as shown in FIGS. 10 and 11, conductive outer layer 66 may be configured to form a partial loop of conductive material with ends that are aligned with the edges of conductive structures 14T and 14B.

Figure 10:
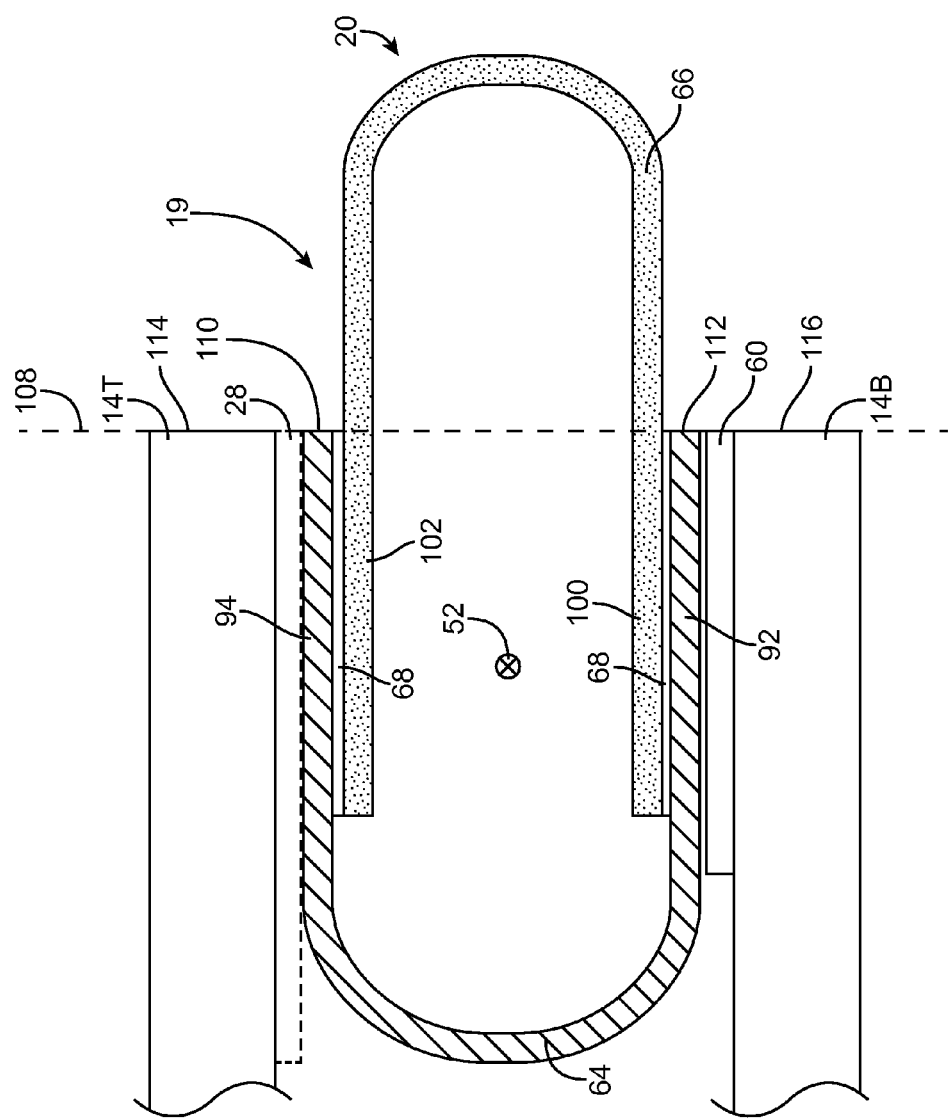
FIG. 10 is a cross-sectional side view of a portion of a hollow gap-filling member in which a wall is formed from a partial conductive loop of material with edges that are attached to a partial loop of insulating material in accordance with an embodiment of the present invention.
Figure 11:
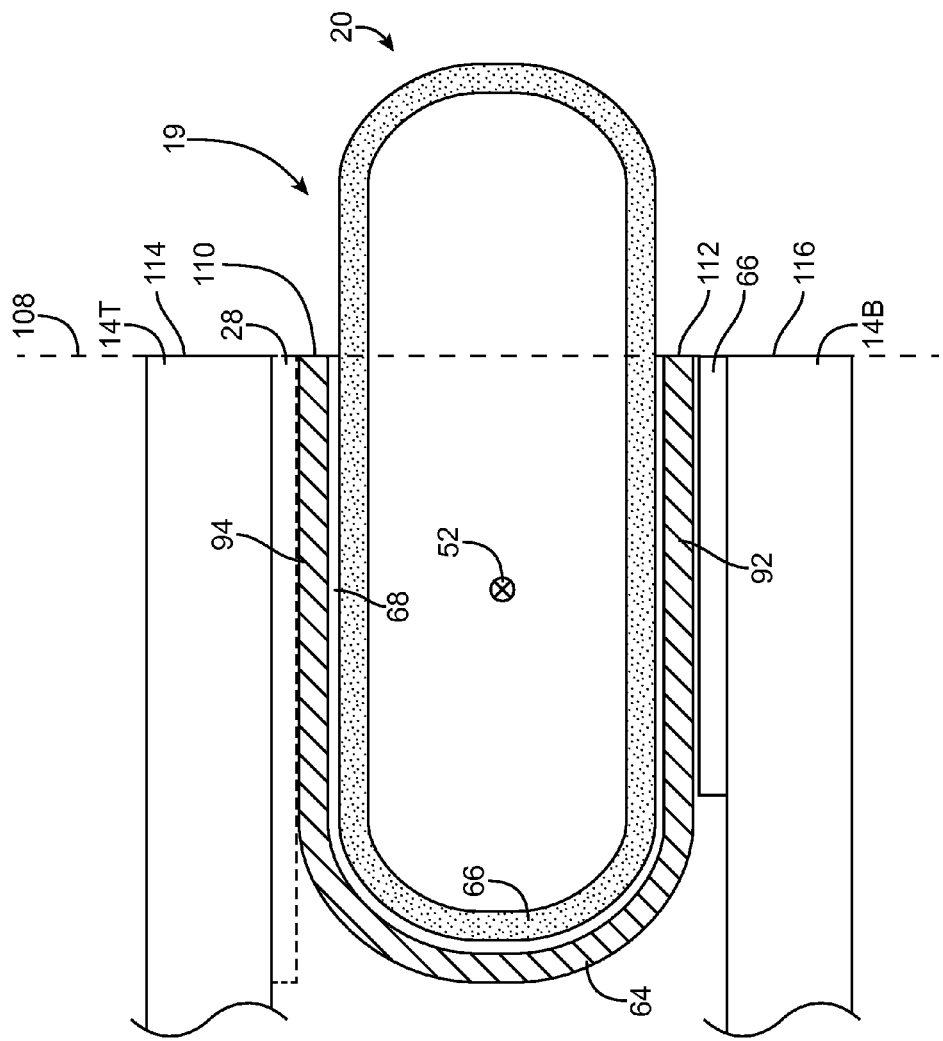
FIG. 11 is a cross-sectional side view of a portion of a hollow gap-filling member in which a wall is formed from a partial conductive loop of material with edges that are attached to a loop of insulating material in accordance with an embodiment of the present invention.

In the example of FIG. 10, edge portions 94 and 92 of outer conductive layer 64 have respective edges 110 and 112. Ends 110 and 112 may be aligned with plane 108. Plane 108 may be defined by a plane that is parallel and in-contact with edges 114 and 116 of respective conductive structures 14T and 14B. Edge 92 of layer 64 may be attached to structure 14B using conductive adhesive 66. Edge 94 of layer 64 may be formed in contact with insulating material 28 on structure 14T in order to prevent member 20 from forming an electrical connection between structures 14T and 14B. Edge portion 100 of inner layer 66 may be attached to edge portion 92 of outer layer 64 using adhesive 68. Edge portion 102 of inner layer 66 may be attached to edge portion 94 of outer layer 64 using additional adhesive 68.

In some configurations, edges 114 and 116 of structures 14T and 14B may not be formed in a common plane. For example, edge 116 may extend beyond edge 114 or edge 114 may extend beyond edge 116. In configurations in which edges 114 and 116 of structures 14T and 14B are not formed in a common plane, end 110 of layer 64 may be aligned with edge 114 of structure 14T and end 112 may be aligned with edge 116 of structure 14B.

As shown in FIG. 10, inner layer 66 may be bent in a way that a portion of inner layer 66 extends beyond edges 114 and 116. Because layer 66 is formed from non-conductive materials, electromagnetic interference from portions of member 20 that extend beyond plane 108 may be avoided in this way.

The example of FIG. 10 in which edge portions 92 and 94 of conductive layer 64 are attached to respective edge portions 100 and 102 of non-conductive layer 66 is merely illustrative. As shown in FIG. 11, outer conductive layer 64 may be attached to a continuous tubular inner layer 66 while end 110 of layer 64 is aligned with edge 114 of structure 14T and end 112 is aligned with edge 116 of structure 14B.

By providing gap-filling conductive members such as members 20 of FIGS. 10 and 11 with ends that are aligned with edges of conductive structures that form the gap, a relatively uniform conductive face may be presented to an antenna such as antenna 22 (see, e.g., FIG. 3) even in devices in which gaps have sizes that vary from device to device. In this way, electromagnetic interference from reflected or absorbed radiation in the gap may be reduced.

The foregoing is merely illustrative of the principles of this invention and various modifications can be made by those skilled in the art without departing from the scope and spirit of the invention.

What is claimed is:

1. An electronic device, comprising:
a first conductive structure;
a second conductive structure;
a gap between the first conductive structure and the second conductive structure; and
a conductive member that at least partially fills the gap, wherein the conductive member has a conductive outer layer and a non-conductive inner layer, wherein the non-conductive inner layer has a first edge portion and an opposing second edge portion that is directly attached to the first edge portion using adhesive that is in direct contact with both the first and second edge portions.

2. The electronic device defined in claim 1, further comprising an antenna, wherein the conductive member is configured to prevent signals from the antenna from entering the gap.

3. The electronic device defined in claim 2 wherein the conductive outer layer has a first edge portion and an opposing second edge portion that is attached to the first edge portion of the conductive outer layer and the first edge portion of the non-conductive inner layer.

4. The electronic device defined in claim 3 wherein the opposing second edge portion of the conductive outer layer is interposed between the first edge portion of the conductive outer layer and the first edge portion of the non-conductive inner layer.

5. The electronic device defined in claim 3, further comprising:
conductive adhesive interposed between the first edge portion of the conductive outer layer and the second conductive structure.

6. The electronic device defined in claim 5, further comprising:
an insulating material interposed between a portion of the conductive outer layer and the first conductive structure.

7. The electronic device defined in claim 6 wherein the insulating material comprises polyethylene.

8. The electronic device defined in claim 1 wherein the gap comprises an air gap.

9. The electronic device defined in claim 8 wherein the gap has a width that is less than 3 millimeters.

10. The electronic device defined in claim 9, further comprising an additional gap between the conductive outer layer and the first conductive structure.

11. The electronic device defined in claim 10 wherein the additional gap has a width that is smaller than the width of the gap.

12. The electronic device defined in claim 1, further comprising a display, wherein the first and second conductive structures each comprise a portion of the display.

13. An electronic device, comprising:
first and second conductive structures;
a gap between the first and second conductive structures; and
a conductive member that at least partially fills the gap, wherein the conductive member has a conductive layer and an insulating layer, wherein the insulating layer has a first edge portion and an opposing second edge portion, wherein the conductive layer has a first edge portion and opposing second edge portion, wherein the first edge portion of the conductive layer is attached to the first edge portion of the insulating layer, wherein the opposing second edge portion of the conductive layer is attached to the opposing second edge portion of the insulating layer, and wherein the first conductive structure overlaps all of the conductive layer and only a portion of the insulating layer.

14. The electronic device defined in claim 13, further comprising an antenna mounted near the gap, wherein the conductive member is configured to prevent emission from the antenna from interacting with the gap.

15. The electronic device defined in claim 14 wherein a first end of the conductive layer is aligned with an edge of the first conductive structure and an opposing second end of the conductive layer is aligned with an edge of the second conductive structure.

16. The electronic device defined in claim 15, further comprising a conductive adhesive that attaches the first edge portion of the conductive layer to the first conductive structure.

17. The electronic device defined in claim 16, further comprising an insulating material interposed between the opposing second edge portion of the conductive layer and the second conductive structure.

18. The electronic device defined in claim 17 wherein the opposing second edge portion of the conductive layer is interposed between the insulating material and the opposing second edge portion of the insulating layer.

19. The electronic device defined in claim 13, further comprising a display having a light-emitting layer, wherein the first conductive structure comprises a conductive portion of the light-emitting layer of the display.

* * * * *